United States Patent Office 3,833,602
Patented Sept. 3, 1974

3,833,602
N-CARBAMOYL- AND N-THIOCARBAMOYL-4,5,6,7-TETRAHYDROBENZTRIAZOLES
Karl Heinz Buchel, Wuppertal-Elberfeld, and Ingeborg Hammann, Cologne, Germany, assignors to Bayer Aktiengesellschaft, Leverkusen, Germany
No Drawing. Filed Apr. 4, 1972, Ser. No. 241,071
Claims priority, application Germany, Apr. 16, 1971, P 21 17 464.1
Int. Cl. A01n 9/12, 9/22; C07d 55/04
U.S. Cl. 260—308 B      5 Claims

ABSTRACT OF THE DISCLOSURE

N-carbamoyl- and N-thiocarbamoyl-4,5,6,7-tetrahydrobenztriazoles of the general formula

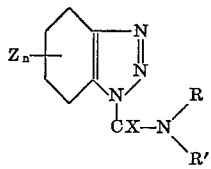

in which

R is lower alkyl or optionally substituted phenyl,
R' is R or hydrogen,
Z is alkyl, haloalkyl or halogen,
n is an integer from 0 to 4, and
X is oxygen or sulfur, which possess insecticidal and acaricidal properties.

The present invention relates to and has for its objects the provision of particular new N-carbamoyl- and N-thiocarbamoyl - 4,5,6,7 - tetrahydrobenztriazoles, i.e. N-(N,N-di-alkyl or optionally substituted phenyl-carbamoyl) (optionally substituted-4,5,6,7-tetrahydrobenztriazoles) and their N-thiocarbamoyl analogues, which possess insecticidal and acaricidal properties, active compositions in the form of mixtures of such compounds with solid and liquid dispersible carrier vehicles, and methods for producing such compounds and for using such compounds in a new way especially for combating pests, e.g. insects and acarids, with other and further objects becoming apparent from a study of the within specification and accompanying examples.

It is known from German Pat. 956,638 and Swiss Patent Specification 279,553 that carbamates are used for the control of injurious insects and acarids. However, their activity in the case of low amounts applied and concentration is not always wholly satisfactory.

Another class of compounds, viz phosphoric acid esters, is distinguished in general by very good insecticidal and acaricidal effectiveness but is poorly tolerated by warm-blooded animals.

Both of these classes also cause resistance symptoms, particularly in the case of acaricides (cf. S. P. Georghion, Advances in Pest Control, Research, Vol. VI, 196). For this reason, search was made for a new insecticidal and acaricidal agent which, like already known carbamates, exhibits a low toxicity to warm-blooded animals and, if possible, causes no substantial resistance symptoms.

The present invention provides hemicyclic urea derivatives, namely N-carbamoyl- and N-thiocarbamoyl-4,5,6,7-tetrahydrobenztriazoles, of the formula:

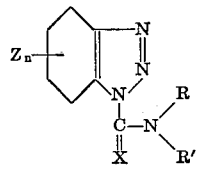

in which

R is lower alkyl or optionally substituted phenyl,
R' is R or hydrogen,
Z is alkyl, haloalkyl or halogen,
n is an integer from 0 to 4, and
X is oxygen or sulfur.

These compounds exhibit very good insecticidal and acaricidal properties.

Surprisingly, the N-carbamoyl-4,5,6,7-tetrahydrobenztriazoles or N-thiocarbamoyl-4,5,6,7-tetrahydrobenztriazoles according to the invention show a considerably higher insecticidal and acaricidal effectiveness, with low toxicity to warm-blooded animals and good toleration by plants, than the 1-phenyl-3-methyl-5-pyrazolyl-dimethylcarbamate (Compound A) known from Swiss Patent Specification 279,553, which is the closest active compound of the same type of activity. The substances according to the invention therefore represent an enrichment of the art.

When R or R' is substituted phenyl, preferred substituents include halogen, epecially chlorine; lower alkyl or alkoxy with up to 4 carbon atoms, especially methyl; haloalkyl with 1 or 2 carbon atoms; cyano or nitro. Preferably Z is chlorine or lower alkyl or halo-lower alkyl with up to 3 carbon atoms. Preferably n is 0, 1 or 2.

The invention also provides a process for the production of a compound of formula (I) in which a 4,5,6,7-tetrahydrobenztriazole of the formula:

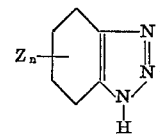

in which

Z and n have the meanings stated above, is reacted with either
  (a) an isocyanate or isothiocyanate of the formula:

$$R—N=C=X \quad (III)$$

in which

R and X have the meanings stated above, optionally in the presence of a diluent as well as in the presence of a basic catalyst, or
  (b) a carbamoyl or thiocarbamoyl chloride of the formula:

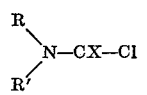

in which

R, R' and X have the meanings stated above, optionally in the presence of a diluent as well as in the presence of a tertiary organic base as acid-binding agent, or
  (c) phosgene or thiophosgene and an amine of the formula:

in which

R and R' have the meanings stated above, optionally in the presence of a diluent.

If 4,5,6,7 - tetrahydrobenztriazole and methylisocyanate are used as starting materials in variant (a), the reaction course can be represented by the following formula scheme:

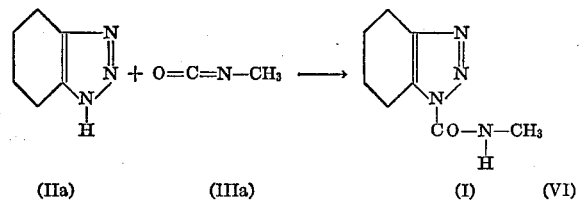

(IIa)   (IIIa)   (I)   (VI)

As diluent in variant (a) polar organic solvents are suitable. These include preferably nitriles such as acetonitriles; sulfoxides such as dimethyl sulfoxide; formamides such as dimethyl formamide; ketones such as acetone; ether such as diethyl ether and tetrahydrofuran; nitroalkanes such as nitromethane and asymmetric chlorinated hydrocarbons such as methyl chloride and chloroform.

A few drops of a basic catalyst, preferably a tertiary base, particularly triethylamine, are added as reaction accelerator.

The reaction temperatures can be varied within a fairly wide range. In general, the work is carried out at about 0° C. to 50° C., preferably at about 20° C. to 40° C.

Each mole of the compound of formula (II) is preferably reacted with 1 to 2 moles of isocyanate or isothiocyanate. A greater excess does not lead to any substantial improvement of yield.

To isolate the compounds of formula (I) the solvent is evaporated off in a vacuum, the residue is rubbed with ether and recrystallized from acetone/ether.

As diluent in variant (b), the above-mentioned solvents are suitable.

If in variant (b) 4,5,6,7,-tetrahydrobenztriazole and N,N-dimethylthiocarbamoyl chloride are used as starting materials, the reaction course can be represented by the following formula scheme:

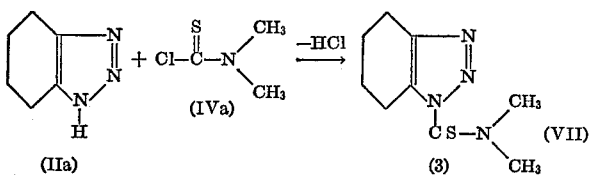

(IIa)   (IVa)   (3)   (VII)

Variant (b) is carried out in the presence of an acid-binder, preferably tertiary organic bases. Preferably, pyridine is used. It is, however, also possible to use all other normally usable organic acid-binders, such as alkyl-amines, or inorganic acid-binders such as alkali metal carbonates and alkaline earth metal carbonates.

The reaction temperatures in variant (b) can likewise be varied within a fairly wide range. In general, the work is carried out at about 50° C. to 150° C., preferably at about 80° C. to 120° C.

When carrying out process variant (b), 1 mole of the compound of formula (II) is reacted preferably with about 1 mole of the compound of formula (IV) and about 1 mole of acid-binder.

To isolate the compounds of formula (I), the solvent is evaporated in a vacuum and the residue is taken up with ether; the hydrochloride which also forms remains behind. After the ether has been distilled off, a residue is obtained which is purified by crystallization or fractionation.

If in variant (c) 4,5,6,7-tetrahydrobenztriazole, phosgene and methylethylamines are used as starting materials, the reaction course can be represented by the following formula scheme:

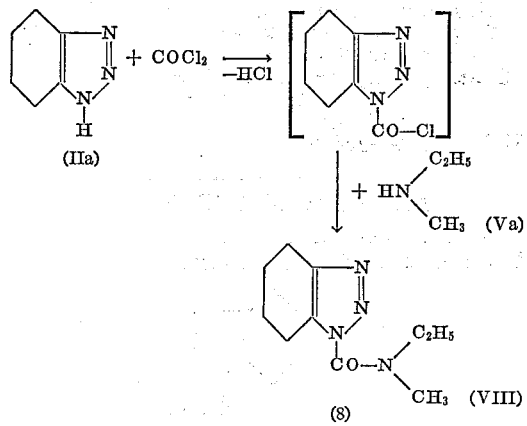

As diluent in variant (c) all inert, higher-boiling organic solvents are suitable. These include preferably aromatic hydrocarbons, such as toluene, xylene or benzene.

The reaction temperatures here too can be varied within a fairly wide range. In general, the work is carried out at about 80° C. to 150° C., preferably at about 80° C. to 120° C.

When carrying out the process, 1 mole of the compound of formula (II) is reacted with about 1 mole of phosgene and about 1 mole of amine of formula (V) according to U.S. Patent Specification 2,272,695. The isolation of the compound of formula (I) takes place according to the methods there stated.

The 4,5,6,7-tetrahydrobenztriazoles used as starting materials are disclosed in German Published Patent Application 1,948,794.

As examples of the hemicyclic ureas of formula (I) according to the invention, there are mentioned in particular:

1-(methylamino)-carbonyl-4,5,6,7-tetrahydrobenztriazole
1-(dimethylamino)-carbonyl-4,5,6,7-tetrahydrobenztriazole
1-(methylamino)-thiocarbonyl-4,5,6,7-tetrahydrobenztriazole
1-(dimethylamino)-thiocarbonyl-4,5,6,7-tetrahydrobenztriazole
1-(dibutylamino)-carbonyl-4,5,6,7-tetrahydrobenztriazole
1-(butylamino)-carbonyl-4,5,6,7-tetrahydrobenztriazole
1-(methyl-ethylamino)-carbonyl-4,5,6,7-tetrahydrobenztriazole
5-methyl-1-(methylamino)-carbonyl-4,5,6,7-tetrahydrobenztriazole
5-chloro-1-(methylamino)-carbonyl-4,5,6,7-tetrahydrobenztriazole
1-(anilino)-carbonyl-4,5,6,7-tetrahydrobenztriazole
1-(p-chloro-anilino)-carbonyl-4,5,6,7-tetrahydrobenztriazole
1-(toluidino)-carbonyl-4,5,6,7-terahydrobenztriazole
1-(ethylamino)-carbonyl-4,5,6,7-tetrahydrobenztriazole
1-(diethylamino)-carbonyl-4,5,6,7-tetrahydrobenztriazole
1-(butylamino)-thiocarbonyl-4,5,6,7-tetrahydrobenztriazole
1-(ethylamino)-thiocarbonyl-4,5,6,7-tetrahydrobenztriazole The active compounds according to the invention exhibit, with low phytotoxicity, strong insecticidal or acaricidal properties. The active compounds can therefore be used with success for the control of noxious sucking and biting insects, Diptera and mites (Acarina).

To the sucking insects contemplated herein there belong, in the main, aphids (Aphidae) such as the green peach aphid (Myzus persicae), the bean aphid (Doralis fabae), the bird cherry aphid (Rhopalosiphum padi), the pea aphid (Macrosiphum pisi) and the potato aphid (Macrosiphum solanifolii), the current gall aphid (Cryptomyzus korschelti), the rosy apple aphid (Sappaphis mali), the mealy plum aphid (Hyalopterus arundinis) and the cherry black-fly (Myzus cerasi); in addition, scales and mealybugs (Coccina), for example the oleander scale (Aspidiotus hederae) and the soft scale (Lecanium hesperidum) as well as the grape mealybug (Pseudococcus maritimus); thrips (Thysanoptera), such as Hercinothrips femoralis, and bugs, for example the beet bug (Piesma quadrata), the red cotton bug (Dysdercus intermedius), the bed bug (Cimex lectularius), the assassin bug (Rhodnius prolixus) and Chagas' bug (Triatoma infestans) and, further, cicadas, such as Euscelis bilobatus and Nephotettix bipunctatus; and the like.

In the case of the biting insects contemplated herein, above all there should be mentioned butterfly caterpillars (Lepidoptera) such as the diamond-back moth (Plutella maculipennis), the gypsy moth (Lymantria dispar), the brown-tail moth (Euproctis chrysorrhoea) and tent caterpillar (Malacosoma nustria); further, the cabbage moth (Mamestra brassicae) and the cutworm (Agrotis segetum), the large white butterfly (Pieris brassicae), the small winter moth (Cheimatobia brumata), the green oak tortrix moth (Tortrix viridana), the fall armyworm (Laphygma frugiperda) and cotton worm (Prodenia litura), the ermine moth (Hyponomeuta padella), the Mediterranean flour moth (Ephestia kühniella) and greater wax moth (Galleria mellonella); and the like.

Also to be classed with the biting insects contemplated herein are beetles (Coleoptera), for example the granary weevil (Sitophilus granarius=Calandra granaria), the Colorado beetle (Leptinotarsa decemlineata), the dock beetle (Gastrophysa viridula), the mustard beetle (Phaedon cochleariae), the blossom beetle (Meligethes aeneus), the raspberry beetle (Byturus tomentosus), the bean weevil (Bruchidius=Acanthoscelides obtectus), the leather beetle (Dermestes frischi), the khapra beetle (Trogoderma granarium), the flour beetle (Tribolium castaneum), the northern corn billbug (Calandra or Sitophilus zeamais), the drugstore beetle (Stegobium paniceum), the yellow mealworm (Tenebrio molitor) and the sawtoothed grain beetle (Oryzaephilus surinamensis), and also species living in the soil, for example wireworms (Agriotes spec.) and larvae of the cockchafer (Melolontha); cockroaches, such as the German cockroach (Blattella germanica), American cockroach (Periplaneta americana), Madeira cockroach (Leucophaea or Rhyparobia maderae), oriental cockroach (Blatta orientalis), the giant cockroach (Blaberus giganteus) and the black giant cockroach (Blaberus fuscus) as well as Henschoutedenia flexivitta; further, Orthoptera, for example the house cricket (Acheta domesticus); termites such as the eastern subterranean termite (Reticulitermes flavipes) and Hymenoptera such as ants, for example the garden ant (Lasius niger); and the like.

The Diptera contemplated herein comprise essentially the flies, such as the vinegar fly (Drosophila melanogaster), the Mediterranean fruit fly (Ceratitis capitata), the house fly (Musca domestica), the little house fly (Fannia canicularis), the black blow fly (Phormia regina) and blue bottle fly (Calliphora erythrocephala) as well as the stable fly (Stomoxys calcitrans); further, gnats, for example mosquitoes such as the yellow fever mosquito (Aedes aegypti), the northern house mosquito (Culex pipiens) and the malaria mosquito (Anopheles stephensi); and the like.

With the mites (Acari) contemplated herein there are classed, in particular, the spider mites (Tetranychidae) such as the two-spotted spider mite (Tetranychus telarius =Tetranychus althaeae or Tetranychus urticae) and the European red mite (Paratetranychus pilosus=Panonychus ulmi), gall mites, for example the black currant gall mite (Eriophyes ribis) and tarsonemids, for example the broad mite (Hemitarsonemus latus) and the cyclamen mite (Tarsonemus pallidus); finally, ticks, such as the relapsing fever tick (Ornithodorus moubata); and the like.

When applied against hygiene pests and pests of stored products, particularly flies and mosquitoes, the compounds of the invention are also distinguished by an outstanding residual activity on wood and clay, as well as good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene. xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers such as ground natural minerals (e.g. koalins, clays, alumina, silica, chalk, i.e. calcium carbonate, talc, attapulgite. montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/ or with other known compatible active agents, especially plant protection agents such as other insecticides and acaricides or rodenticides, fungicides, bactericides, nematocides, herbicides, fertilizers, growth-regulating agents, etc., if desired, or in the form of particular dosage preparations for specific application made therefrom, such as solutions, emulsions, suspensions. powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–10%, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form. e.g. average particle diameter of from 50–100 microns, or even less, i.e. mist form, for example by airplane crop spraying techniques. Only up to at most about a few liters/hectare are needed, and often amounts only up to about 15 to 1000 g./hectare, preferably 40 to 600 g./hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids, fungi, bacteria and yeasts, and more particularly methods of combating at least one of insects and acarids, which comprises applying to at least one of correspondingly (a) such insects, (b) such acarids, and (c) the corresponding habitat thereof, i.e. the locus to be protected, a correspondingly combative or toxic amount, i.e. an insecticidally or acaricidally effective amount, of the particular active compound of the invention alone or together with a carrier vehicle as noted above. The instant formulations or compositions are applied in the usual manner, for instance by spraying, atomizing, vaporizing, scattering, dusting, watering squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

*Phaedon* larvae test

Solvent: 3 parts by weight dimethyl formamide
Emulsifier: 1 part by weight alkylaryl polyglycol ether To produce a suitable preparation of active compound, 1 part by weight of the active compound is mixed with the stated amount of solvent containing the stated amount of emulsifier, and the concentrate is diluted with water to the desired concentration.

Cabbage leaves (*Brassica oleracea*) are sprayed with the preparation of the active compound until dripping wet and then infested with mustard beetle larvae (*Phaedon cochleariae*).

After the specified periods of time, the degree of destruction is determined as a percentage: 100% means that all the beetle larvae are killed. 0% means that none of the beetle larvae are killed.

The active compounds, the concentration of the active compound, the times of evaluation and the results can be seen from the following Table 1.

TABLE 1
(Plant-damaging insects)
Phaedon larvae test

| Active compounds | Concentration of active compound in percent | Degree of destruction in percent after 3 days |
|---|---|---|
| (A) CH$_3$C—CH—O, N—C—O—C—N(CH$_3$)$_2$, phenyl (known) | 0.2<br>0.02 | 95<br>0 |
| (1) benzotriazole–CO—NH—CH$_3$ | 0.2<br>0.02 | 100<br>75 |
| (2) benzotriazole–CO—N(CH$_3$)$_2$ | 0.2<br>0.02 | 100<br>80 |

EXAMPLE 2

*Myzus* test (contact action)

Solvent: 3 parts by weight dimethyl formamide
Emulsifier: 1 part by weight alkylarylpolyglycol ether To produce a suitable preparation of active compound, 1 part by weight of the active compound is mixed with the stated amount of solvent containing the stated amount of emulsifier and the concentrate is diluted with water to the desired concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 2:

TABLE 2
(Plant damaging insects)

*Myzus* test

| Active compounds | Concentration of active compound in percent | Degree of destruction in percent after 1 day |
|---|---|---|
| (A) CH₃C——CH   O<br>    ‖         ‖<br>    N     C—O—C—N(CH₃)₂<br>     \\   /<br>      N<br>      \|<br>      C₆H₅<br>(known) | 0.2<br>0.02<br>0.002 | 100<br>35<br>0 |
| (1) [tetrahydrobenztriazole]—CO—NH—CH₃ | 0.2<br>0.02<br>0.002 | 100<br>80<br>30 |
| (2) [tetrahydrobenztriazole]—CO—N(CH₃)₂ | 0.2<br>0.02<br>0.002 | 100<br>100<br>40 |
| (3) [tetrahydrobenztriazole]—CS—N(CH₃)₂ | 0.2<br>0.02<br>0.002 | 100<br>100<br>20 |

EXAMPLE 3

*Tetranychus* test (resistant)

Solvent: 3 parts by weight dimethyl formamide
Emulsifier: 1 part by weight alkaryl polyglycol ether To produce a suitable preparation of active compound, 1 part by weight of the active compound is mixed with the stated amount of solvent containing the stated amount of emulsifier and the concentrate so obtained is diluted with water to the desired concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 3:

TABLE 3
(Plant damaging mites)

*Tetranychus* test (resistant)

| Active compounds | Concentration of active compound in percent | Degree of destruction in percent after 2 days |
|---|---|---|
| (A) CH₃C——CH   O<br>    ‖         ‖<br>    N     C—O—C—N(CH₃)₂<br>     \\   /<br>      N<br>      \|<br>      C₆H₅<br>(known) | 0.2 | 0 |
| (1) [tetrahydrobenztriazole]—CO—NH—CH₃ | 0.2<br>0.02 | 100<br>75 |
| (2) [tetrahydrobenztriazole]—CO—N(CH₃)₂ | 0.2 | 95 |

The following further examples are set forth to illustrate, without limitation, the process for producing the active compounds according to the present invention.

EXAMPLE 4

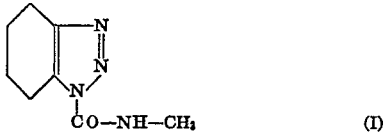

(1)

12.5 g. (0.1 mole) of 4,5,6,7-tetrahydrobenztriazole are dissolved in 150 ml. of anhydrous tetrahydrofuran. While stirring, 8.5 g. (0.15 mole) of methylisocyanate in 50 ml. of anhydrous acetonitrile are added, and thereafter a few drops of triethylamine. After the mixture has been left to stand for about nine hours at room temperature, the solvent is distilled off in a vacuum. The oily residue is treated with ether and acetone and crystallizes therefrom in colorless crystals. There are obtained 17.5 g. (97% of theory) of 1-(methylamino)-carbonyl-4,5,6,7-tetrahydrobenztriazole of the melting point 98° to 102° C.

EXAMPLE 5

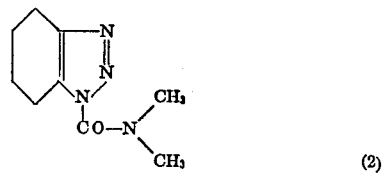

(2)

12.5 g. (0.1 mole) of 4,5,6,7-tetrahydrobenzitriazole and 10.7 g. (0.1 mole) of N,N-dimethylcarbamoyl chloride with addition of 0.1 mole of pyridine in 200 ml. of anhydrous acetonitrile are heated to the boil for 18 hours. Thereafter, the solvent is distilled off in a vacuum, the residue is stirred with about 300 ml. of anhydrous ether and suction filtered from the undissolved pyridine hydrochloride.

The ethereal solution is evaporated to dryness and the residue is dried in a vacuum. There are obtained 16.5 g. (85% of theory) of 1-(dimethylamino)-carbonyl-4,5,6,7-tetrahydrobenztriazole as a colorless oil of the refractive index $n^D_{20}=1.5258$.

EXAMPLES 6–13

In a manner analogous to that of the above Examples, there are obtained the compounds identified in the following Table.

TABLE 4

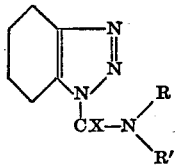

| Example number | X | R | R' | Melting point, °C. or refractive index |
|---|---|---|---|---|
| 6 | S | $CH_3$ | $CH_3$ | 66–69 |
| 7 | S | H | $CH_3$ | 127–129 |
| 8 | O | $n\text{-}C_4H_9$ | $n\text{-}C_4H_9$ | $n^{D}_{22}$=1.4998 |
| 9 | S | H | $C_4H_9$ | $n^{D}_{22}$=1.5441 |
| 10 | O | ⟨C₆H₄⟩–Cl | H | 151–153 |
| 11 | O | $C_2H_4Cl$ | $CH_3$ | oil |
| 12 | S | H | $C_2H_5$ | $n^{D}_{22}$=1.5450 |
| 13 | O | $C_2H_5$ | $C_2H_5$ | $n^{D}_{22}$=1.4872 |

It will be appreciated that the instant specification and examples are set forth by way of illustration and not limitation, and that various modifications and changes may be made without departing from the spirit and scope of the present invention.

What is claimed is:

1. An N-carbamoyl - 4,5,6,7 - tetrahydrobenztriazole of the formula

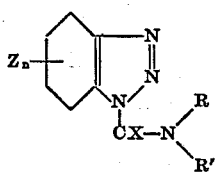

(1)

in which

R is lower alkyl, tolyl or parachlorophenyl,
R' is R or hydrogen,
Z is lower alkyl or halogen,
n is 0 or 1, and
X is oxygen or sulfur.

2. A compound according to claim 1 in which Z is chlorine or lower alkyl.

3. The compound according to claim 1 wherein such compound is 1-(methylamino)-carbonyl-4,5,6,7-tetrahydrobenztriazole of the formula

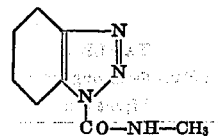

(1)

4. The compound according to claim 1 wherein such compound is 1-(dimethylamino)-carbonyl-4,5,6,7-tetrahydrobenztriazole of the formula

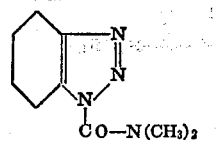

(2)

5. The compound according to claim 1 wherein such compound is 1-(methylamino)-thiocarbonyl 4,5,6,7-tetrahydrobenztriazole of the formula

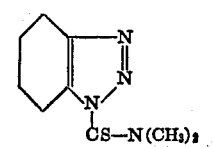

(3)

References Cited

UNITED STATES PATENTS 3,732,238   5/1973   Baker et al. _____ 260—308 B

OTHER REFERENCES

Lambie et al., Chem. Abstracts, vol. 63, column 8373d (1965), QD1A51.

ALTON D. ROLLINS, Primary Examiner

U.S. Cl. X.R.

424—269

UNITED STATES PATENT OFFICE
CERTIFICATE OF CORRECTION

Patent No. 3,833,602      Dated September 3, 1974

Inventor(s) KARL HEINZ BUCHEL ET AL

It is certified that error appears in the above-identified patent and that said Letters Patent are hereby corrected as shown below:

Col. 1, line 6, (claims priority), cancel "April 16, 1971" and substitute -- April 10, 1971 --.

Col. 5, line 56, after "Melolontha" insert -- melolontha --.

Signed and sealed this 12th day of November 1974.

(SEAL)
Attest:

McCOY M. GIBSON JR.
Attesting Officer

C. MARSHALL DANN
Commissioner of Patents